United States Patent [19]

Hasenbein et al.

[11] Patent Number: 5,003,001

[45] Date of Patent: Mar. 26, 1991

[54] IONIC CROSSLINKING OF AN ETHYLENE COPOLYMER IN TWIN-SCREW EXTRUDER

[75] Inventors: Norbert Hasenbein, Dirmstein; Lothar Schlemmer, Maxdorf; Thomas Muehlenbernd, Heidelberg; Gernot Koehler, Worms, all of Fed. Rep. of Germany

[73] Assignee: BASF Aktiengesellschaft, Ludwigshafen, Fed. Rep. of Germany

[21] Appl. No.: 366,493

[22] Filed: Jun. 14, 1989

[30] Foreign Application Priority Data

Jun. 30, 1988 [DE] Fed. Rep. of Germany ....... 3822069

[51] Int. Cl.$^5$ .............................................. C08F 8/42
[52] U.S. Cl. ................................... 525/53; 525/327.8; 525/329.5; 525/330.2; 525/330.6; 525/366; 525/367; 525/369; 525/370; 525/371; 159/2.3; 159/25.1; 159/DIG. 16; 528/481; 528/489
[58] Field of Search ............... 528/489, 499, 501, 481; 525/327.8, 329.5, 330.2, 366, 367, 369, 370, 371, 330.6, 52, 53; 159/2.3, 25.1

[56] References Cited

U.S. PATENT DOCUMENTS

| | | | |
|---|---|---|---|
| 3,006,029 | 10/1961 | Saxton et al. | 18/12 |
| 3,264,272 | 8/1966 | Rees | 525/330.2 |
| 3,404,134 | 10/1968 | Rees | 525/330.2 X |
| 3,969,434 | 7/1976 | Powell et al. | 525/373 X |
| 4,727,131 | 2/1988 | Kock et al. | 528/483 |

FOREIGN PATENT DOCUMENTS

| | | | |
|---|---|---|---|
| 0193110 | 9/1986 | European Pat. Off. | 525/330.2 |
| 0252204 | 11/1986 | Japan | 525/330.2 |
| 1475336 | 6/1977 | United Kingdom | 525/330.2 |

*Primary Examiner*—Fred Teskin
*Attorney, Agent, or Firm*—Keil & Weinkauf

[57] ABSTRACT

Ionically crosslinked ethylene copolymers prepared by mixing a carboxyl-containing copolymer with an aqueous metal salt solution in the reaction zone of a twin-screw extruder and transferring the product to a devolatilization zone, and are used as adhesion promoters, injection molded articles or laminating films.

2 Claims, No Drawings

IONIC CROSSLINKING OF AN ETHYLENE COPOLYMER IN TWIN-SCREW EXTRUDER

The present invention relates to a process for the preparation of ionically crosslinked ethylene copolymers by mixing an ethylene copolymer which contains, as copolymerized units, from 0.1 to 20 mol % of $\alpha,\beta$-ethylenically unsaturated carboxylic acids or $\alpha,\beta$-ethylenically unsaturated comonomers donating carboxyl groups with a water-soluble metal salt at above the melting point of the ethylene copolymer in a twin-screw extruder.

Processes of this type give thermoplastic ethylene copolymers with carboxyl-containing monomers, some of the carboxyl groups being present in free form while the remainder are bonded to metal cations, so that a certain degree of crosslinking is achieved.

Processes for modifying carboxyl-containing ethylene copolymers are described in, for example, U.S. Pat. Nos. 3,264,272 and 3,969,434 and British Patent 1,475,336. The preparation is carried out in rubber mills, two-roll mills and plastifying extruders having a length-/diameter ratio of 21 or in a single-screw extruder as described in, for example, U.S. Pat. No. 3,006,029.

However, the processes have the disadvantage that the homogeneity of the crosslinked ethylene copolymers obtained is unsatisfactory.

An elegant process for the preparation of ionically crosslinked ethylene copolymers having improved product homogeneity is described in EP-A-01 93 110. There, however, specially designed devolatilization orifices are required in order to prevent the product from being forced out of the devolatilization orifice and being drawn in again in an uncontrolled manner, resulting in the formation of specks. Particularly where large amounts of aqueous acetic acid solutions have to be evaporated and removed, foaming occurs and, owing to material being drawn in an uncontrolled manner, specks are formed. Moreover, a relatively long reaction zone is required for the reaction, so that there is scarcely any extruder length available for effective devolatilization.

It is an object of the present invention to provide a process for ionic crosslinking of ethylene copolymers in an extruder, in which, on the one hand, products having good homogeneity are obtained and, on the other hand, effective devolatilization of the product, particularly at high polymer throughputs, is ensured.

It is a further object of the present invention to provide an ionically crosslinked ethylene copolymer which leads to products having good film quality, to adhesion promoters and to injection molded articles, which products should have very little odor.

We have found that this object is achieved by a process for the preparation of ionically crosslinked ethylene copolymers by mixing an ethylene copolymer which contains, as copolymerized units, from 0.1 to 20 mol % of $\alpha,\beta$-ethylenically unsaturated carboxylic acids or $\alpha,\beta$-ethylenically unsaturated comonomers donating carboxyl groups with a water-soluble metal salt at above the melting point of the ethylene copolymer in a twin-screw extruder, wherein, in a first zone, the reaction zone, the aqueous metal salt solution is quantitatively reacted with the ethylene copolymer and, in a second zone, the devolatilization zone, the ionomer is completely devolatilized.

The temperature in the first extruder zone is preferably from 140° to 180° C.

The temperature in the second extruder zone is preferably from 200° to 270° C.

In another preferred process, the mean residence time in the first extruder zone is from 10 to 15 s and that in the second extruder zone is from 40 to 60 s.

We have found that this object is furthermore achieved by ionically crosslinked ethylene copolymers obtained by a process above.

Suitable ethylene copolymers are copolymers of ethylene which contain, as copolymerized units, 0.1-20, preferably 0.25-10, mol %, based on the copolymer, of $\alpha,\beta$-ethylenically unsaturated carboxylic acids or $\alpha,\beta$-ethylenically unsaturated comonomers donating carboxyl groups. For the purposes of the present invention, $\alpha,\beta$-ethylenically unsaturated carboxylic acids are the usual carboxylic acids which are copolymerizable with ethylene, such as acrylic acid, methacrylic acid, itaconic acid, maleic acid and fumaric acid. $\alpha,\beta$-Ethylenically unsaturated comonomers donating carboxyl groups are, for example, methyl hydrogen maleate, maleic anhydride, tert-butyl acrylate, etc., ie. comonomers which are converted into carboxyl-containing comonomers during or after the polymerization by hydrolysis and/or by pyrrolysis. The ethylene copolymers can contain, in addition to the $\alpha,\beta$-ethylenically unsaturated carboxylic acids or comonomers donating carboxyl groups, other comonomers which are copolymerizable with ethylene, as copolymerized units (cf. EP-A 1 106 999). Esters of (meth)acrylic acid, mono- and diesters of maleic acid and fumaric acid, amides of monoethylenically unsaturated carboxylic acids, in particular (meth)acrylamide and N-mono- and N,N-dialkylamides of (meth)acrylic acid, are particularly suitable. The ethylene copolymers are known per se and are described in, for example, GB-A 2 091 745, U.S. Pat. No. 3,520,861, U.S. Pat. No. 3,264,272, GB-A 1 011 981, U.S. Pat. No. 3,404,134 or U.S. Pat. No. 3,969,434. Other suitable ethylene copolymers are the corresponding graft copolymers.

The melt flow indices of the ethylene copolymers are in general 0.1–500 g/10', measured at 190° C. and 2.16 kp (according to DIN 53,735). Preferred products are those having a melt flow index of 2–80 g/10'. The melting points of the ethylene copolymers are from 70° to 115° C.

Water-soluble metal salts are compounds as defined in, for example, U.S. Pat. No. 3,264,272. Compounds having metal ions, such as sodium and zinc, are preferred. Zinc acetate, sodium acetate and zinc formate are particularly preferred.

In general, not less than 10% by weight of the acid groups in the ethylene copolymer are neutralized. The degree of neutralization can be determined by IR analyses, by titration or by metal analysis.

According to the invention, ionic crosslinking of the ethylene copolymer is effected in a corrosion-resistant twin-screw extruder, for example ZSK 57 from Werner & Pfleiderer. For this purpose, the ethylene copolymer is metered into the cooled extruder feed blanketed with nitrogen and is melted at 140°–180° C., preferably 140°–160° C. The metal salt solution is pumped into the melt, mixed in homogeneously and reacted to give the ionomer (reaction zone = first zone). The reaction zone has a length of 5 D (D is the length of the zone expressed as a multiple of the screw diameter) or is even shorter. This is surprising since, according to EP-A 193 110, a reaction zone having a length of 6–15 D is required. Nevertheless, the reaction zone used according to the invention is sufficient for complete conversion of the metal salt.

The first extruder zone is followed by a second extruder zone, the devolatilization zone. The latter is preferably more than 15 D long and is equipped with 3 devolatilization domes operated at different levels of reduced pressure, preferably 800, 100 and 10 mbar. The temperatures in the devolatilization zone are 200°–270° C., preferably 220°–260° C., very particularly preferably 250°–260° C. This is surprising since, in the process described in EP-A 193 110, the temperatures must not be higher than 230° C. In the novel process, the mean residence time is preferably from 10 to 15 s in the first extruder zone and from 40 to 60 s in the second extruder zone, the mean residence time being the time in which half the particles covered by the residence time spectrum have passed through the extruder zone.

EXAMPLE 1

100 kg of an ethylene/acrylic acid copolymer (8% by weight of acrylic acid; MFI 15 g/10′, determined according to DIN 53,735) are metered into the feed orifice of a ZSK 57 twin-screw extruder from Werner & Pfleiderer, having a length diameter ratio of 39. The length of the feed zone is three and a half times the screw diameter (3.50 D).

The copolymer is melted in the extruder over a length of 9 D (D=ratio of length of the zone to screw diameter) at 140° C. and is transferred to the reaction zone having a length of 5 D. In the reaction zone, 18 kg/h of a 20% strength by weight aqueous zinc acetate solution are sprayed in. The copolymer and the zinc acetate solution are mixed at 220° C. and are reacted. The acetic acid liberated during this reaction and the water introduced together with the zinc acetate solution are removed in the downstream three-stage devolatilization zone having a length of 18.5 D at 220° C., via 3 devolatilization vents arranged in series, under reduced pressure. A pressure of about 800 mbar is maintained at the first devolatilization vent, about 100 mbar at the second devolatilization vent and about 10 mbar at the third devolatilization vent. The mean residence times in the reaction zone and devolatilization zone are 12 and 45 s, respectively.

The ionically crosslinked copolymer is extruded via the die plate mounted at the end of the discharge zone (length 6.5 D; temperature 220° C.). In the resulting end product, 35.4 mol % of the carboxyl groups have been neutralized with zinc ions; the MFI is 1.9 g/10′. The product is completely odorless and free of specks. It is very particularly suitable for the laminating and packaging sectors.

EXAMPLE 2

100 kg of an ethylene/acrylic acid copolymer (8% by weight of acrylic acid; MFI 15 g/10′, determined according to DIN 53,735) are metered into the feed orifice of a ZSK 57 twin-screw extruder from Werner & Pfleiderer, having a length diameter ratio of 39. The length of the feed zone is three and a half times the screw diameter (3.50 D).

The copolymer is melted in the extruder over a length of 9 D at 140° C. and is transferred to the reaction zone having a length of 5 D. In the reaction zone, 18 kg/h of a 20% strength by weight aqueous zinc acetate solution are sprayed in. The copolymer and the zinc acetate solution are mixed at 220° C. and are reacted. The acetic acid liberated during this reaction and the water introduced together with the zinc acetate solution are removed in the downstream three-stage devolatilization zone having a length of 18.5 D at 260° C., via 3 devolatilization vents arranged in series, under reduced pressure. A pressure of about 800 mbar is maintained at the first devolatilization vent, about 100 mbar at the second devolatilization vent and about 10 mbar at the third devolatilization vent. The mean residence times in the reaction zone and devolatilization zone are 12 and 45 s, respectively.

The ionically crosslinked copolymer is extruded via the die plate mounted at the end of the discharge zone (length 6.5 D; temperature 260° C.). In the resulting end product, 35.4 mol % of the carboxyl groups have been neutralized with zinc ions; the MFI is 1.9 g/10′. The product is completely odorless and free of specks. It is very particularly suitable for the laminating and packaging sectors.

COMPARATIVE EXAMPLE 1

The procedure described in Example 1 is followed, except that the devolatilization zone contains only 2 devolatilization vents. A pressure of 100 mbar is maintained at the first devolatilization vent and a pressure of 10 mbar at the second devolatilization vent.

During the devolatilization process, foaming and uncontrolled rising of the melt into the devolatilization vent frequently occurs. Films of the ionomers prepared contain a large number of specks. The mechanical properties of the ionomer films are poorer than those of the films prepared from ionomers according to Example 1. The acetic acid liberated cannot be removed quantitatively from the polymer melt, as is evident from Table 1.

TABLE 1

|  | Speck level | Film rating | Acetic acid* ppm | DDI** d | Tensile strength*** N/mm$^2$ |
|---|---|---|---|---|---|
| Example 1 | Low | 3.25 | <2 | 930 | 47 |
| Comparative Experiment 1 | High | 4.5 | 810 | 630 | 25 |

*Determined by gas chromatography after extraction with CHCl$_3$
**Determined according to ASTM 1709, DDI = dart drop impact
***Determined according to DIN 53,455

COMPARATIVE EXAMPLE 2

The procedure described in Example 2 is followed, except that the devolatilization zone contains only 2 devolatilization vents. A pressure of 100 mbar is maintained at the first devolatilization vent and a pressure of 10 mbar at the second devolatilization vent.

During the devolatilization process, foaming and uncontrolled rising of the melt into the devolatilization vent frequently occurs. Films of the ionomers prepared contain a large number of specks. The mechanical properties of the ionomer films are poorer than those of the films prepared from ionomers according to Example 2. The acetic acid liberated cannot be removed quantitatively from the polymer melt, as is evident from Table 2.

TABLE 2

|  | Speck level | Film rating | Acetic acid* ppm | DDI** d | Tensile strength*** N/mm$^2$ |
|---|---|---|---|---|---|
| Example 2 | Low | 3.25 | <2 | 925 | 46 |
| Comparative | High | 5.0 | 690 | 570 | 17 |

TABLE 2-continued

| | Speck level | Film rating | Acetic acid* ppm | DDI** d | Tensile strength*** N/mm² |
|---|---|---|---|---|---|
| Experiment 2 | | | | | |

*Determined by gas chromatography after extraction with CHCl₃
**Determined according to ASTM 1709
***Determined according to DIN 53,455

We claim:

1. A process for the preparation of an ionically crosslinked ethylene copolymer by mixing an ethylene copolymer which contains, as copolymerized units, from 0.1 to 20 mol % of at least one α, β-ethylenically unsaturated carboxylic acid(s) or α, β-ethylenically unsaturated comonomer(s) donating carboxyl groups with an aqueous metal salt solution at above the melting point of the ethylene copolymer in a twin-screw extruder, wherein in a first zone, the reaction zone, the aqueous metal salt solution is quantitatively reacted with the ethylene copolymer at a temperature from 140° to 180° C. to give an ionomer and, in a second zone, a three-stage devolatilization zone, the ionomer is completely devolatilized at a temperature from 200° to 270° C.

2. A process as defined in claim 1, wherein the mean residence time in the first zone is from 10 to 15 seconds and that in the second zone is from 40 to 60 seconds.

* * * * *